US008002617B1

(12) United States Patent
Uskela et al.

(10) Patent No.: US 8,002,617 B1
(45) Date of Patent: Aug. 23, 2011

(54) SPONSORED NETWORK GAMES

(75) Inventors: Sami Uskela, Helsinki (FI); Aapo Rautianen, Espoo (FI); Eva-Maria Leppanen, Tampere (FI); Mari K. Nieminen, Tampere (FI); Lucia Tudose, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/405,088

(22) Filed: Sep. 27, 1999

(51) Int. Cl.
*A63F 9/24* (2006.01)

(52) U.S. Cl. .................. 463/1; 463/25; 463/29; 705/14; 725/22; 725/23

(58) Field of Classification Search ............ 700/91, 700/90; 463/1, 25, 29, 40–43; 725/30, 32, 725/109, 110, 111, 112, 114, 115, 118, 22, 725/23, 33–36; 705/14; 709/200, 201–203, 709/208, 212, 213, 217, 218, 219, 220, 223, 709/224, 225, 249, 250; 713/153, 154; 395/500.13, 395/500.15
See application file for complete search history.

(56) References Cited

U.S. PATENT DOCUMENTS

| 5,245,656 | A | * | 9/1993 | Loeb et al. ................. 308/23 X |
| 5,635,979 | A | * | 6/1997 | Kostreski et al. ............. 348/13 |
| 5,748,493 | A | * | 5/1998 | Lightfoot et al. ......... 364/514 C |
| 5,823,879 | A | | 10/1998 | Goldberg et al. |
| 5,838,790 | A | * | 11/1998 | McAuliffe et al. ........... 380/4 X |
| 5,862,325 | A | * | 1/1999 | Reed et al. .............. 395/200.31 |
| 5,918,213 | A | * | 6/1999 | Bernard et al. ................. 705/26 |
| 5,933,811 | A | * | 8/1999 | Angles et al. .............. 705/14.56 |
| 5,937,037 | A | * | 8/1999 | Kamel et al. ............... 379/88.19 |
| 5,948,061 | A | * | 9/1999 | Merriman et al. ............ 709/219 |
| 5,964,660 | A | * | 10/1999 | James et al. ..................... 463/1 |
| 5,974,398 | A | * | 10/1999 | Hanson et al. .................. 705/14 |
| 6,024,643 | A | * | 2/2000 | Begis .............................. 463/42 |
| 6,029,195 | A | * | 2/2000 | Herz ............................. 709/219 |
| 6,088,717 | A | * | 7/2000 | Reed et al. .................... 709/201 |
| 6,119,098 | A | * | 9/2000 | Guyot et al. ................ 705/14 X |
| 6,128,651 | A | * | 10/2000 | Cezar ........................... 709/217 |
| 6,128,663 | A | * | 10/2000 | Thomas ................... 709/228 X |
| 6,134,532 | A | * | 10/2000 | Lazarus et al. .................. 705/14 |
| 6,141,010 | A | * | 10/2000 | Hoyle ....................... 345/356 X |
| 6,144,944 | A | * | 11/2000 | Kurtzman, II et al. ...... 705/14 X |
| 6,152,824 | A | * | 11/2000 | Rothschild et al. ............. 463/42 |
| 6,161,127 | A | * | 12/2000 | Cezar et al. ................... 709/203 |
| 6,179,713 | B1 | * | 1/2001 | James et al. .................... 463/42 |
| 6,216,129 | B1 | * | 4/2001 | Eldering ................... 707/10 X |
| 6,224,486 | B1 | * | 5/2001 | Walker et al. .................. 463/42 |

(Continued)

FOREIGN PATENT DOCUMENTS

EP 0 752 678 A2 1/1997

(Continued)

OTHER PUBLICATIONS

EP 00120915.4 Summons to attend oral proceedings, dated Apr. 4, 2008.

(Continued)

*Primary Examiner* — Pierre E Elisca
(74) *Attorney, Agent, or Firm* — Ditthavong Mori & Steiner, P.C.

(57) ABSTRACT

A system and method for supplying selected advertising to gamers accessing games suppliers over communications networks including mobile networks. Data on the user's geographic location and personal profile are used to select the advertising. The selected advertising is displayed in the game either on screen borders or at selected intervals in the game.

20 Claims, 3 Drawing Sheets

U.S. PATENT DOCUMENTS

| | | | |
|---|---|---|---|
| 6,264,560 B1 * | 7/2001 | Goldberg et al. | 463/42 |
| 2005/0143169 A1 * | 6/2005 | Nguyen et al. | 463/25 |
| 2007/0105607 A1 * | 5/2007 | Russell et al. | 463/1 |

FOREIGN PATENT DOCUMENTS

| | | |
|---|---|---|
| JP | 8-276047 | 10/1996 |
| JP | 9-10440 | 1/1997 |
| JP | 9-251296 | 9/1997 |
| JP | 10240828 A | 9/1998 |
| JP | 10-309377 | 11/1998 |
| JP | 11057209 A | 3/1999 |
| JP | 11-248484 | 9/1999 |
| WO | WO 97/07656 | 3/1997 |
| WO | WO 97/26061 | 7/1997 |

OTHER PUBLICATIONS

Japanese Office Action for corresponding JP Application No. 2000-293436, Mar. 18, 2010, Japan, pp. 1-10.

Japanese Office Action for corresponding JP Application No. 2000-293436, Aug. 6, 2009, Japan.

Japanese Office Action for corresponding JP Application No. 2000-293436, Oct. 14, 2010, Japan, pp. 1-4.

* cited by examiner

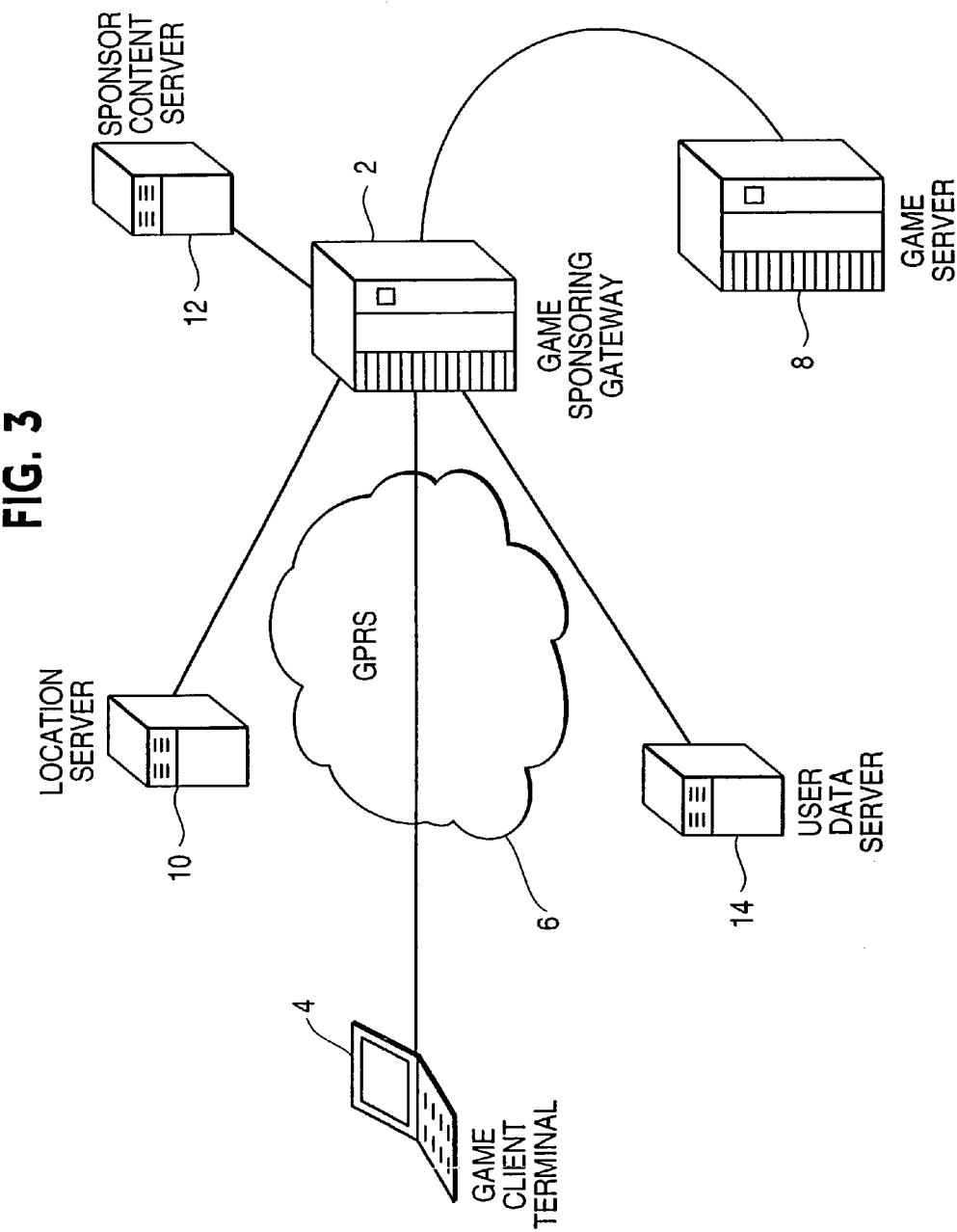

SPONSORED NETWORK GAMES

TECHNICAL FIELD

The invention pertains to supplying games to gamers over communication networks that are either hard-wired, cellular, mobile, satellite or combinations thereof. Advertising is inserted into the game content as a revenue source. The advertising is tailored to the specific gamer.

Definitions
EDGE Enhanced Data Rates for GSM Evolution
ETSI European Telecommunications Standardization Institute
GSG Game Sponsoring Gateway
GPRS General Packet Radio Service
GSM Global System for Mobile Communications
HSCSD High Speed Circuit Switched Data
IP Internet Protocol
ISDN Integrated Services Digital Network
LAN Local Area Network
SMS Short Message Service
TDMA Time Division Multiple Access
UMTS Universal Mobile Telecommunications System
WAP Wireless Application Protocol
WCDMA Wideband Code Division Multiple Access

BACKGROUND OF THE INVENTION

Multi-user games are being played over communications networks, including the Internet. Typically, a server supports each game. Game sessions are typically long in duration but the amount of data transferred between the game server and the gamer terminal during a session is limited.

Games could be distributed over a mobile communications network including a mobile packet data network. Using mobile communications networks to support game distribution is more costly then using hard-wired landlines due to connection costs. The costs could be a barrier to the distribution of games over a mobile network.

There are many games supplied over the Internet. They include game-land.com, hotgames.com, Future Games Network, Moraff Games, Yahoo Games, Candystand.com, Pop Rocket, and BingoMania™ to name a few. Generic advertising is displayed to the game user when signing onto the game site.

OBJECTS OF THE INVENTION

An object of the invention is to provide advertising to a gamer at selected intervals. Another object of the invention is to provide advertising to a gamer directed to him based on his demographic, geographic, preference or customized user database. Yet another object of the invention is to allow the network operator, including mobile networks, to provide advertising in the data stream of games at selected intervals.

SUMMARY OF THE INVENTION

A Game sponsoring Gateway (GSG) is a communication hub to route game requests to a Game Server and responds by supplying the requested game. Along with the game is supplied selected advertising. Criteria for selection are referenced to the geographic location of the gamer for geographic sensitive ads. Another set of criteria is the gamers' preferences and profile as determined by reference to a database. Advertisement selection and display is determined by user preferences or appropriate breaks in gaming.

BRIEF DESCRIPTION OF THE DRAWINGS

FIG. 3 is a graphical representation of the game sponsoring architecture of the present invention.

DETAILED DESCRIPTION OF THE INVENTION

Wireless data usage is doubling every year in advanced markets. Many cellular operators already earn over 5% of their revenues from data traffic. In addition to income from traditional service subscription and usage, wireless data brings new ways to generate revenue. These new revenue sources include content provisioning, value-added services, Internet access and services, advertising and vertical services for specific market segments. Successful operators will be the innovators and market makers for these new applications.

GPRS Functionality

Figure 1:
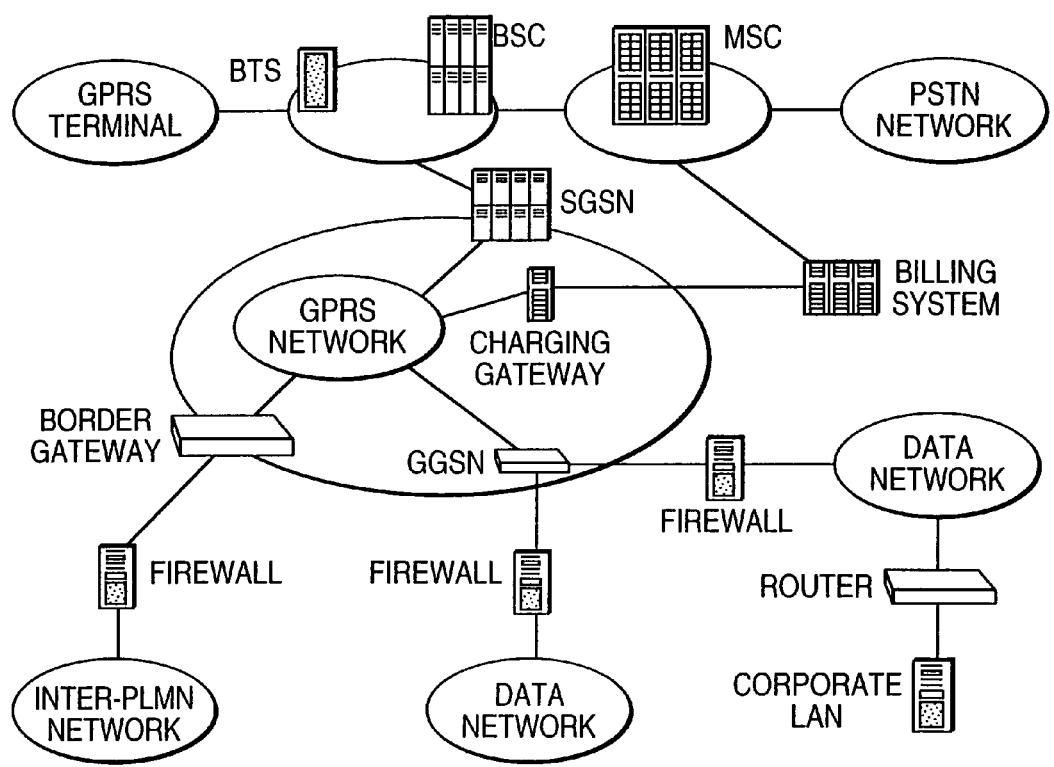
FIG. 1 is a graphical representation of the Assignee's prior art GGSN connection to the GPRS Network.

General Packet Radio Service (GPRS) illustrated in FIG. 1 is the best platform for mobile data networking services. GPRS is also an essential stepping-stone to third generation personal multimedia services. But for mobile operators and service providers, GPRS revolutionizes business and working practices, a trend that is both driven and reinforced by the convergence of telecommunications and data networking. GPRS opens up new opportunities, but also introduces challenges, the most significant of which are changes in the tariff model and introduction to the new IP infrastructure. A complete GPRS solution features both comprehensive charging facilities as well as best-in-class GPRS core IP network.

With the Internet and GSM coming ever closer together, people will want personalized wireless data services, creating an opportunity to generate new business by meeting these demands.

Traditionally, GSM operators have offered value-added services by providing mobile access to existing telecommunication services. With GPRS, mobile operators have a superb IP delivery vehicle that enables them to re-evaluate and transform their role in the value chain, not only by preserve existing business but to grow revenue.

Comprehensive end-to-end solutions will require new partnerships with solution and content providers. The Assignee is in the forefront of WAP development and a leading wireless datacom supplier, and is already helping to bring operators together with content providers, and 3rd party software developers.

An example of use a commercial embodiment of the GPRS system is a mobile user that is a salesman getting an e-mail reminder for a customer meeting. The user double-checks the customer profile from the company database by typing its name into the GPRS terminal. The user does need to not place a call, as the user is constantly logged on to his LAN because his terminal is equipped with GPRS. The GPRS terminal connects to the corporate intranet via the mobile operator's GPRS network. Quickly, the salesman briefs himself with the customer's order history, personnel profiles, current stock, product history and price level. All this is transmitted via short bursts of data. Customer queries can be answered immediately, enabling real-time, interactive sales and marketing. When the meeting concludes, the salesman types a short report and submits it with the click of a button.

GPRS brings true packet data connectivity to the GSM market, paving the way for the next generation of Personal Multimedia services. GPRS integrates GSM and Internet Protocol (IP) technologies, adding convenience and immediacy to mobile data services. With peak data rates of over 100 kbit/s, GPRS offers instant packet-switched data connections to data networks, such as the Internet, Internet Service Providers (ISPs) and corporate intranets all delivered via GSM technology.

GPRS is a superb bearer for different types of wireless data applications with bursty data, especially WAP based information retrieval and database access. GPRS will bring cost effective packet data connectivity to the mobile mass market. Session set-up is nearly instantaneous, while higher bit rates enable convenient personal and business applications. Consequently, GPRS not only makes wireless applications more usable, but also opens up a variety of new applications in personal messaging and wireless corporate intranet access.

GPRS packet-switched data technology makes efficient use of radio and network resources and is a key stepping stone to the third generation. The complete solution for creating and implementing GPRS data services includes an IP core and radio network infrastructure, as well as integrated GPRS service and billing solutions.

To upgrade an existing GSM radio network for GPRS, the solution includes new software that can be remotely downloaded to Nokia Base Stations, so no site visits are needed.

In addition, the GPRS solution includes new stand-alone network elements: the Serving GPRS Support Node (SGSN), the Gateway GPRS Support Node (GGSN) as shown in FIG. 1 and the Charging Gateway.

For operators, GPRS brings opportunities to capture more corporate business. With the GPRS solution, the corporate intranet can be securely connected directly to the operator's GPRS network. GPRS has the highest security solution on the market for complete data protection.

An end-to-end GPRS system provides a future-proof evolution path to EDGE and third generation technologies.

The GGSN connects the GPRS network to the Internet, Internet Service Providers (ISPs) and corporate intranets, allowing simultaneous multiple secure data access points. The GGSN architecture is based on an IP routing platform, offering such advanced features as integrated firewall functionality for excellent data security.

The SGSN is a network element that converts protocols between the IP core and the radio network, as well as serving such functions as mobility management, user verification and collection of billing data. Based on the proven the Assignee's DX 200 telecommunication switching platform, the SGSN is designed with built-in redundancy for excellent system reliability and scalability.

Unique to the solution is the stand-alone Charging Gateway, which provides a single access point from the GPRS network to the operator's billing system. Charging information generated by the SGSN and GGSN is relayed to this system, which then consolidates and pre-processes the data records to reduce billing system processing for uninterrupted service.

In September 1998, the first call using a Third Generation terminal of the Assignee was made on a test network in Japan. Testing continues and has reached an important milestone on its road to Third Generation mobile telephony. It is expected that by 2001, the first commercial Third Generation mobile network will be launched, and the world will be introduced to digital mobile multimedia communications.

Full-scale personal multimedia services set very demanding requirements for the core network of 3rd generation mobile systems. GSM, as the most modern digital system in the market, is the best platform choice.

Future networks will be based on the GSM core network including future GPRS packet data functionality. The ATM-interfaced WCDMA radio access will be connected to the GSM/GPRS core network. Also EDGE will be fully based on an evolution of the GSM system.

From the user point of view, all current GSM services will be provided in 3rd generation. Provisions that allow users to seamlessly use their services when roaming from a 2nd generation network to a 3rd generation network will be needed. In addition to that, full-scale multimedia services like imaging and video-on-demand will be enabled. The enhanced data services help the operator to maintain a superior service offering as demand develops.

The GSM network sub-system will evolve in phases of flexible upgrades of existing GSM MSCs towards a 3rd generation core network. The phased approach minimizes infrastructure investments and allows seamless service in GSM and WCDMA coverage areas.

In the first phase, a 2nd generation GSM MSC and GPRS system will operate the WCDMA radio network through inter-working functionality. For packet services, the GPRS structure will be upgraded to accommodate much larger data throughputs. At this stage the end user will see higher packet data rates and radio transmission capacity. Within 3rd generation the data speeds will match or exceed PSTN modem data connections. Customers will enjoy current GSM data services and enhancements such as HSCSD, GPRS and EDGE, and further benefit from true Personal Multimedia via the new 3rd generation WCDMA radio interface. A parallel evolution of services will ensure a rich availability of applications.

In the second phase, ATM functionality will be added to the GSM MSC. This will enable fast broadband ATM-switching of personal multimedia content towards other networks such as ATM, IP, PSTN/N-ISDN.

The core network internal architecture is distributed and thus will provide modularity in increasing the capacity flexibly. Only the necessary elements are added as capacity needs grow.

On the application level, boundaries between telecom and data communications, between mobile and fixed, and between private and public networks are becoming increasingly transparent.

This development is most apparent in the office environment. The mobile handset is already often the preferred phone for voice calls. Improving quality of service (QoS) capabilities of IP may soon enable the use of IP as an alternative transport for voice connections. On the other hand the H.323 standard supports combined transport of voice, video and data streams belonging to the same communication session.

For mobile voice and live video, circuit switching will remain for a longer time the mainstream technology. Service and network integration will drive packet switched applications in networks where QoS can be relied on.

With 3rd generation these trends become more apparent, necessitating ATM transport to carry both circuit mode and IP packet mode traffic with guaranteed QoS. Firstly, GPRS will support mobile connections to IP networks, forming a seamless gateway towards integration with the Internet. The applications can be such as intra/Internet packet access at various data rates or IP conferencing including voice over IP networks.

Secondly, mobile and fixed switches can be equipped with IP gateways to intra/extranet. The IP network's transmission capacity can thus be used to carry interexchange voice traffic in a compressed form, supporting IP telephony. GPRS and switch gateways together will allow seamless integration of mobile and IP networks.

GSM is the most common Second Generation mobile telephony standard. GSM is used throughout most of the world for mobile, digital telecommunications. If a mobile phone is used today, the chances are that GSM technology is used therein. GSM is found throughout Europe, Asia, in North and South America, in short, almost everywhere.

GSM is the only standard that fully specifies the complete network architecture, not just the radio access or air interface. This has promoted the creation of a multi-vendor, competitive market environment and unmatched services to the end users. Because of its many strengths, GSM has been chosen as one of the standards from which Third Generation mobile telecommunications will evolve. In fact, the key element in the progression to third generation is GSM's network capability rather than any new or enhanced air interface.

Future networks will be based on the GSM core network evolved with GPRS packet data functionality. This evolved GSM will work in conjunction with WCDMA radio access to give undreamed of Personal Multimedia on the move.

Mobile phones are no longer just phones. Mobile phones will have screens on which electronic multimedia postcards can be composed, send and receive text messages and visual messages, even cartoons. Increases in data transmission speeds, higher processing capacity and other technological advances will give enhanced audio and colorful visual images. The user will be able to receive not just still pictures, but video clips sent by friends, family, colleagues, clients and anyone who wants to create a visual message.

The user will be able to compose multimedia messages. Bluetooth technology will make it easy to use a digital video recorder or camera and send the pictures or video to anyone else who has a 3rd generation terminal. The user will be able to create their own multimedia message and send it anywhere.

The key to this coming boom in wireless data is the Wireless Application Protocol (WAP). The first truly open standard for intelligent messaging services for digital mobile phones and other mobile terminals, WAP will remove the barrier of proprietary solutions, accelerating the pace at which new and exciting services can be launched.

Working with application developers, operators will be able to develop innovative services that will attract new users, who will benefit from a wider choice of mobile applications, advanced services and Internet access.

Multimedia Terminal for Digital Cable Services

The cable version of the Assignee's Mediamaster is identical to its satellite brother, with one exception, the front-end uses another demodulation technique, called QAM (Quadrature Phase Modulation) which is the standard set by the Digital Video Broadcasting (DVB) group. This transmission technique is optimal for cable TV use, where the bandwidth is limited compared to satellite transmissions.

The Assignee's Mediamaster 9500 C enables CATV homes to get access to all of the digital TV and radio programs as well as the interactive services offered by the program providers. A CD-ROM player as well as other computer peripherals can be connected to the data communication ports.

The Assignee's Mediamaster 9500 C can handle 16.-256 QAM signals within a 2-10 MHz bandwidth transmitted via the standardized UHF band to fit any CATV distribution network.

There is a built-in telephone modem designed for V22bis fax or V32bis protocols. This connection is used as the return channel for interactive services. Using an electronic program guide (EPG) the user can navigate throughout the services. So that with a home shopping channel, the user can select goods or items of his or her choice and then order them by pushing the buttons on the remote control. Signals are then sent via the telephone modem to the service provider who takes care of the order and delivers the appropriate products or services.

The same scenario can be used for Pay-Per-View services. If the user decides to watch a sporting event, for example, they can confirm the service ordered by simply pressing the buttons on the hand-set and the program is made available automatically. Downloading of new software is easily done, offering upgrading and new services to the end user as they become available.

The application system resources are comprehensive with a RAM memory of 1 Mbyte (2 Mbytes extension) and a Flash memory of 1, 1.5 or 2 Mbytes depending on the version of the Mediamaster 9500 C.

Deliveries of this box began in March '97 for the German speaking market, where the Kirch group is operating the DF-1 programme bouquet.

Third Generation

Figure 2:
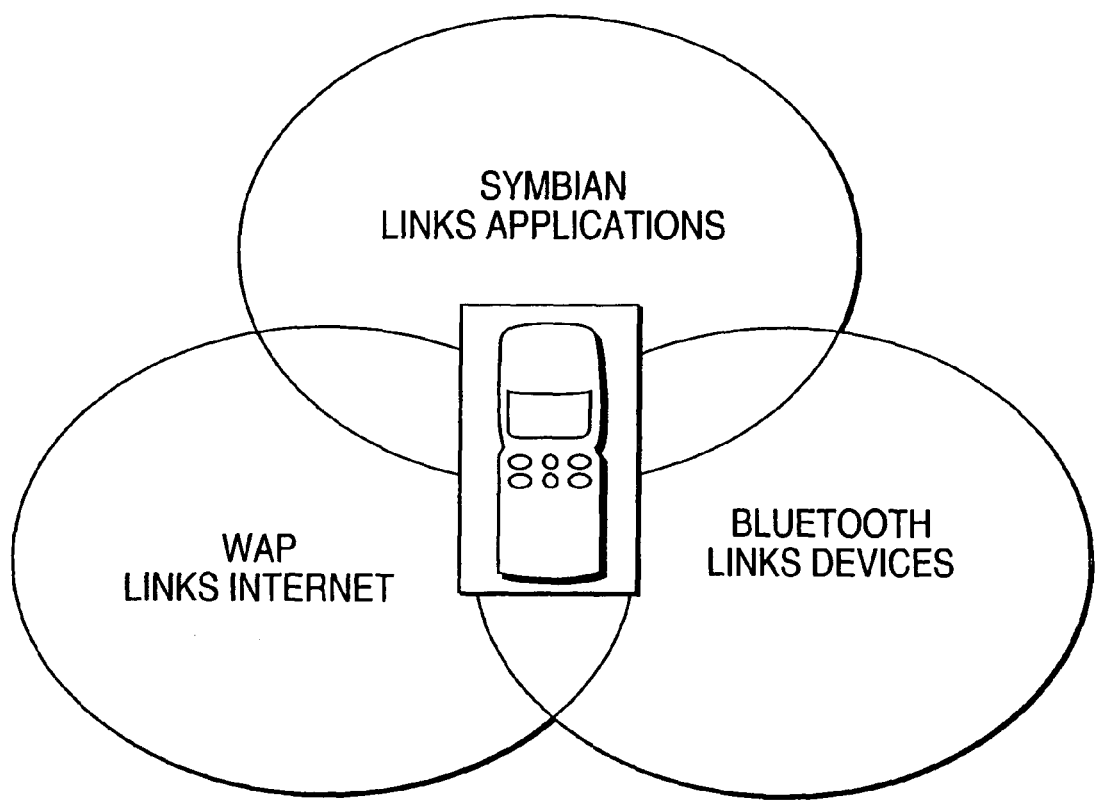
FIG. 2 is a graphical representation of the proposed prior art 3rd Generation mobile network.

Shown in FIG. 2 is the third generation of mobile communications that will combine a number of technologies. These technologies will work together seamlessly to give a high level of multi-media, personal and mobile communication. The technologies supporting this advance are WAP, Bluetooth and Symbian described below.

WAP

The Wireless Application Protocol (http://www.wapforum.org) (WAP) will standardize access to Internet content from mobile phones. WAP provides a link between the Internet and mobile telephony and will accelerate the growth of the market for wireless content services. WAP is compatible with all major cellular systems. In GSM, WAP has many transport options including SMS, GSM data at 9.6 kbit/second, HSCSD and GPRS.

Bluetooth

Bluetooth is a new technology for wireless connectivity. It will allow wireless communications between mobile phones, laptops and other portable devices. Being a radio-based link, Bluetooth doesn't require a line-of-sight connection in order to establish communication.

The Assignee is a founding member of the Bluetooth Special Interest Group (SIG), an industry group consisting of leaders in the telecommunications and computing industries that are driving development of the technology and bringing it to market. Today, there are nearly 700 companies who have joined the consortium. More information about Bluetooth is available at www.bluetooth.com.

Symbian

Symbian (http://www.symbian.com) is a joint venture set up to develop and promote an operating wireless information device called EPOC. This scalable operating system will allow customizable user interfaces, color support, advanced Internet connectivity and accredited connectivity software.

Sponsored Games

The systems above described are an embodiment that also supports the delivery of sponsored games over a mobile network. Other mobile networks will support sponsored games as will hardwire landlines and combinations of the networks.

Existing Games supplied over the internet display advertising generically. One such game provider, candystand.com, has the functionality of a gamer initiated advertisement break. The sponsor of this web site is the candy maker Lifesavers™. After the gamer has logged onto the site a home page flashes pre-selected advertising. The home page has a link to a list of candies and games from which the gamer may further select.

The user clicks on the logo to see advertising messages for the sponsor's candy products. Viewing advertising is initiated by the gamer.

In one embodiment of the present invention one service supplies games and a second tailors and supplies the advertising to the gamer (user). The advertising presentation is dynamic. The advertising can be inserted into predefined placeholders for advertisements in the game screen and also be added to the borders of the screen on which the game is being viewed.

One method of dynamically displaying advertising is to stop the game for a moment and display the commercial. After the commercial the game is restored. The game sequence may be tagged to identify the most convenient break points, or logical transitions, in which to present the advertising. In a war game environment, a logical game break could be between missions but not in the heat of action.

Referring to FIG. 3, a game supporting architecture of the present invention is depicted. The assembled components for this novel system are known in the art. Game Sponsoring Gateway (GSG) 2 responds to a request for a game from Game Client terminal 4. The request is communicated over a GPRS Network 6 or other supporting communication network such as existing mobile communications networks including GSM networks. The GSG 2 communicates with a game server 8 to provide a game-to-game client 4 delivered over a GPRS network 6.

The GSG 2 also communicates with additional servers to organize advertisements for presentation to the game client terminal 4. A location server 10 is contacted that provides information on the user of the game client terminal 4 current address. The GSG 2 also communicates with a sponsor Content Server 12 to provide advertisements to be included in the data stream from the game server 8 to the game client terminal 4. The GSG 2 communicates with user data server 14 to access information on the user's preferences and profile. The information can include how much a advertisement the user accepts, subject matter of interest to the user, purchase history, demographic profile, income level, credit history, online purchase history, web site access history, and like markers of purchasing conduct. There are existing consumer preference models for advertising including those modeled on point of sale databases to tailor advertising including coupons. The location server 10, sponsor content server 12 and user data server 14 are existing independent systems.

As previously stated, when a user accesses a game over this system the initial connection from terminal 4 is via a GPRS system for mobile communications to the GSG 2. The GSG 2 either identifies the user by using authentication mechanisms on the underlying network or by using some other means such as an application level login with a password to the GSG. The GSG then checks the user data server 14 to determine if the user will accept advertisements attached to the selected game. If the answer is affirmative then the GSG 2 retrieves the user's profile from the user data server 14. The profile is accessed to select the appropriate advertisement based on the user profile, demographics, etc. The GSG 2 accesses the location server 10 to get the current geographic location of the user for further use in selecting advertising.

The GSG 2 is supplied advertising by the game sponsors by accessing sponsor content server 12. The information indicates the content of the advertisement and whether it is geographically dependent in appropriate circumstances and like criteria for usage of the advertisement. The GSG 2 uses the criteria supplied by user data server 14 and location server 10 as to what advertising to present to the game user over his terminal 4.

When the GSG 2 receives the game data from the game server 8, it scans the data for advertisement placeholders. The GSG 2 inserts selected advertisements into the placeholders according to the user's profile, preferences and current geographic location as appropriate.

The game environment may contain predefined placeholders to which the GSG 2 may attach the advertisements. This enables advertisements inside the game scenery that are tailored to the user of the game. For instance while playing a Formula 1 racing game, there may be personalized advertisements placed on the inside of the race track. Also personalized ads may be placed in other physical places in the game such as in a dungeon of a game like Doom.

The game environment may have predefined placeholders, e.g., a place for graphical advertisement of any size such as 200×100 pixels.

The GSG 2 detects the placeholder and replaces that with an advertisement personalized for the user of the game.

The game sheet could be distributed in a traditional way (e.g., using CD-ROM). The client may contain additional intelligence as part of the network gaming functionality. The additional functionality may be able to communicate with the GSG 2 while the game if played in the network modes. Thus, the game client may fetch advertisements from the GSG 2 and insert them in the appropriate places in the game.

While this method and system for supplying sponsored advertising has been described as delivered over particular mobile communication networks, GPRS and GSM, any mobile communication network or any communication network will support this application. This description of the invention is illustrative and not exclusive of the means of implementing it.

What we claim is:

1. A system comprising:
    a game sponsoring gateway configured to receive game data for presentation of a game from a game server, and to receive advertising from a sponsor content server,
    wherein the game sponsoring gateway is further configured to,
        insert the advertising in the game data,
        scan the game data to identify a placeholder,
        insert an instruction in the game data to instruct a user terminal to cause presentation of the advertising during a break point in game play,
        insert, at the game sponsoring gateway, the advertising at the placeholder, and
        initiate transmission of the game data to the user terminal.

2. A system of claim 1, wherein the system comprises the game server and the sponsor content server.

3. A system of claim 1, further comprising:
    a location server configured to communicate with the game sponsoring gateway and to determine location of the user terminal,
    wherein the game sponsoring gateway is further configured to receive the location of the user terminal, and to control the presentation of the advertising using the location.

4. A system of claim 1, further comprising:
    a user data server configured to communicate with the game sponsoring gateway and to provide user information from the user terminal,
    wherein the game sponsoring gateway is further configured to receive the user information, and to control the presentation of the advertising using the user information.

5. A system of claim 1, wherein the game sponsoring gateway is further configured to receive a location of the user terminal for selecting geographic sensitive advertising for presentation in the game data.

6. A system of claim 1, wherein the game sponsoring gateway is further configured to receive user information from the user terminal for selecting the advertising for presentation in the game data.

7. A system of claim 1, wherein the game sponsoring gateway is further configured to receive a user profile comprising user preference, and the sponsoring gateway being further configured to select the advertising for presentation in the game data based on the user preference.

8. A system of claim 1, wherein the instruction comprises a tag to identify the break point.

9. A system of claim 1, wherein the instruction further instructs the user terminal to dynamically stop the game to present the advertising.

10. A method comprising:
receiving, at a game sponsoring gateway, game data for presentation of a game;
receiving, at the game sponsoring gateway, advertising;
inserting, at the game sponsoring gateway, the advertising in the game data;
scanning the game data to identify a placeholder;
inserting, at the game sponsoring gateway, an instruction in the game data to instruct a user terminal to cause presentation of advertising during a break point in game play;
inserting, at the game sponsoring gateway, the advertising at the placeholder; and
initiating, at the game sponsoring gateway, transmission of the game data to the user terminal.

11. A method of claim 10, further comprising:
determining location of the user terminal; and
controlling the presentation of the advertising using the location.

12. A method of claim 10, further comprising:
determining user information from the user terminal; and
controlling the presentation of the advertising using the user information.

13. A method of claim 10, further comprising:
determining location information of the user terminal; and
selecting the advertising for presentation in the game data based on the location information.

14. A method of claim 10, further comprising:
receiving a user profile comprising user preference; and
selecting the advertising for presentation in the game data based on the user preference.

15. A method of claim 10, wherein the instruction comprises a tag to identify the break point.

16. A method of claim 10, wherein the instruction further instructs the user terminal to dynamically stop the game to present the advertising.

17. A method comprising:
receiving, at a game sponsoring gateway, a user profile associated with a user terminal;
determining, at a game sponsoring gateway, that the user terminal accepts advertising based on the user profile;
retrieving, at the game sponsoring gateway, an advertisement based on the user profile or on a location of the user terminal;
inserting, at the game sponsoring gateway, the advertising in game data received from a game server;
scanning the game data to identify a placeholder;
inserting, at the game sponsoring gateway, an instruction in the game data to instruct a user terminal to cause presentation of advertising during a break point in game play of the game;
inserting, at the game sponsoring gateway, the advertising at the placeholder; and
initiating, at the game sponsoring gateway, transmission of the game data to the user terminal.

18. A method of claim 17, further comprising:
determining location of the user terminal; and
controlling the presentation of the advertising using the location.

19. A method of claim 17, further comprising:
determining user information from the user terminal; and
controlling the presentation of the advertising using the user information.

20. A method of claim 17, wherein the instruction further instructs the user terminal to dynamically stop the game to present the advertising.

* * * * *